US012564834B2

(12) United States Patent
Pflimlin et al.

(10) Patent No.: US 12,564,834 B2
(45) Date of Patent: Mar. 3, 2026

(54) METHOD FOR MANUFACTURING AN ANALYSIS CHIP AND ANALYSIS CHIP

(71) Applicant: PRECIPHOS, Strasbourg (FR)

(72) Inventors: Pascal Pflimlin, Baldersheim (FR); Bernard Ludwig, Plan-les-Ouates (CH)

(73) Assignee: PRECIPHOS, Strasbourg (FR)

( * ) Notice: Subject to any disclaimer, the term of this patent is extended or adjusted under 35 U.S.C. 154(b) by 550 days.

(21) Appl. No.: 18/252,020

(22) PCT Filed: Nov. 4, 2021

(86) PCT No.: PCT/EP2021/080623
§ 371 (c)(1),
(2) Date: May 5, 2023

(87) PCT Pub. No.: WO2022/096564
PCT Pub. Date: May 12, 2022

(65) Prior Publication Data
US 2023/0415148 A1      Dec. 28, 2023

(30) Foreign Application Priority Data

Nov. 6, 2020      (FR) ...................................... 2011446

(51) Int. Cl.
*B01L 3/00*              (2006.01)
*B01D 61/18*            (2006.01)
(Continued)

(52) U.S. Cl.
CPC .......... *B01L 3/50255* (2013.01); *B01D 61/18* (2013.01); *B01D 63/081* (2013.01);
(Continued)

(58) Field of Classification Search
CPC ........... B01L 3/50255; B01L 3/502707; B01L 3/502753; B01L 9/52; B01L 2300/0681;
(Continued)

(56) References Cited

U.S. PATENT DOCUMENTS

| | | | |
|---|---|---|---|
| 6,207,000 | B1 | 3/2001 | Schwobel et al. |
| 2002/0127585 | A1 | 9/2002 | Nagasawa |

(Continued)

FOREIGN PATENT DOCUMENTS

| | | |
|---|---|---|
| CN | 101759800 A | 6/2010 |
| CN | 108037278 A | 5/2018 |

(Continued)

OTHER PUBLICATIONS

Notice of Deficiencies for Israeli Patent Application No. 302655, dated Aug. 31, 2025.

(Continued)

*Primary Examiner* — Kathryn Elizabeth Limbaugh

(57)              ABSTRACT

Disclosed is a method for manufacturing an analysis chip for analysing a biological sample (1), which method comprises providing a matrix (10) formed in a solid support material in which at least one through hole has been formed (11) and at least one pellet (3), cut out of a sheet (6) of solid and porous analysis material; inserting at least one pellet (3) into the at least one through hole (11) of the matrix (10) by translation of the pellet (3) in a direction at right angles to the lower and upper surfaces of the matrix (10); mechanically assembling at a temperature lower than the melting points of the support and analysis materials by means of a pressing force applied at right angles to the upper surface of the matrix.

16 Claims, 10 Drawing Sheets

(51) Int. Cl.
B01D 63/08 (2006.01)
B01L 9/00 (2006.01)

(52) U.S. Cl.
CPC ...... B01D 63/088 (2013.01); B01L 3/502707 (2013.01); B01L 3/502753 (2013.01); B01L 9/52 (2013.01); B01L 2300/0681 (2013.01); B01L 2300/0829 (2013.01); B01L 2300/161 (2013.01)

(58) Field of Classification Search
CPC ....... B01L 2300/0829; B01L 2300/161; B01D 61/18; B01D 63/081; B01D 63/088
See application file for complete search history.

(56) References Cited

U.S. PATENT DOCUMENTS

| | | |
|---|---|---|
| 2003/0153070 A1 | 8/2003 | Nakajima et al. |
| 2004/0115707 A1 | 6/2004 | Amano |

| | | |
|---|---|---|
| 2004/0258571 A1 | 12/2004 | Lee et al. |
| 2016/0082435 A1 | 3/2016 | Bunner et al. |
| 2017/0028376 A9 | 2/2017 | Hunter et al. |

FOREIGN PATENT DOCUMENTS

| | | |
|---|---|---|
| EP | 1332865 A1 | 8/2003 |
| EP | 1521084 A2 | 4/2005 |
| EP | 3591024 A1 | 1/2020 |
| KR | 101355434 B1 | 1/2014 |
| RU | 154653 U1 | 8/2015 |
| WO | WO0119502 A2 | 3/2001 |
| WO | WO2004067176 A1 | 8/2004 |
| WO | WO2014053237 A1 | 4/2014 |
| WO | WO2020082029 A1 | 4/2020 |

OTHER PUBLICATIONS

First Office Action for Chinese Patent Application No. 202180075390.7, dated Aug. 7, 2025.
Russian Office Action dated Apr. 3, 2024 for Application No. 2023114666/04(031185).
International Search Report dated Feb. 1, 2022 for International Application No. PCT/EP2021/080623.

Fig. 3a1
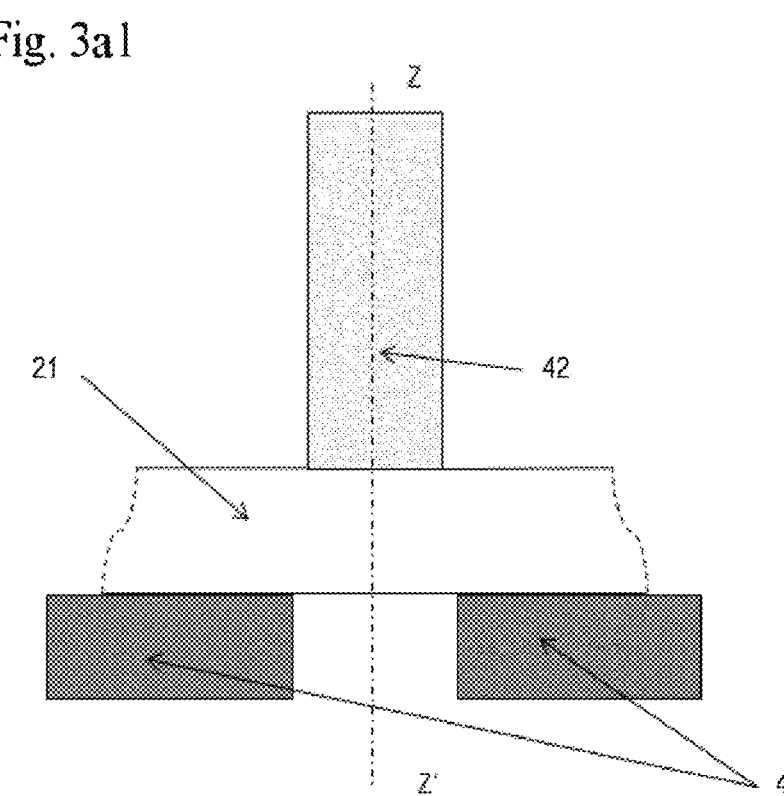
Fig. 3a2
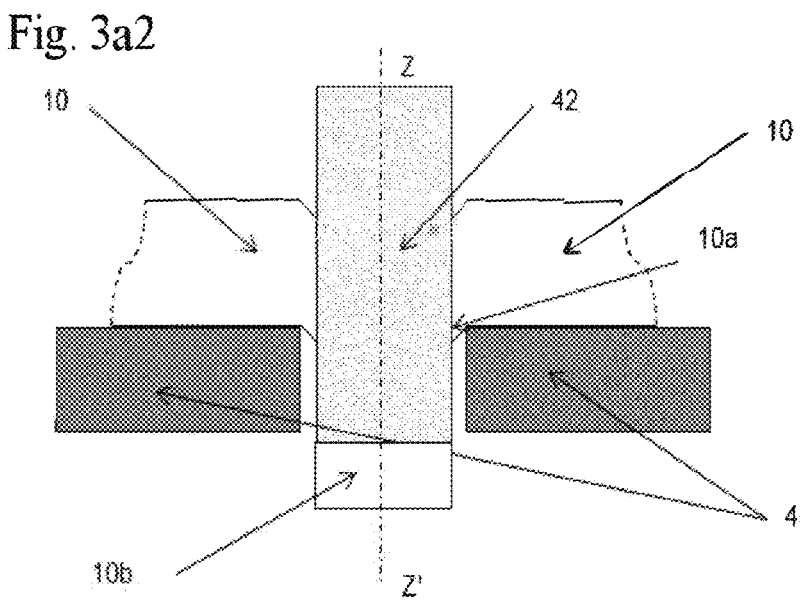

1

10                    3

METHOD FOR MANUFACTURING AN ANALYSIS CHIP AND ANALYSIS CHIP

CROSS-REFERENCE TO RELATED APPLICATION

This application is a national stage application, filed under 35 U.S.C. § 371, of International Patent Application No. PCT/EP2021/080623, filed on Nov. 4, 2021, which claims the priority of French application No. FR2011446 filed Nov. 6, 2020, the contents of which are incorporated by reference.

FIELD OF THE INVENTION

The present invention relates to the field of biological analyses, in particular biochemical analyses.

More specifically, the invention relates to a process for manufacturing filter chips, which can optionally be functionalized to carry out biological analyses.

TECHNOLOGICAL BACKGROUND

In the field of biological analyses, it is known to use protein chips ("protein microarrays") to study the biochemical activity of proteins. In such chips, a library of antibodies or protein fragments ("probes")—or even whole proteins— is placed on a matrix such as a glass slide. In this case, a single sample is tested on all the probes deposited on the matrix.

Biological analysis devices allowing the parallel analysis of several samples have also been developed.

Document WO2014/053237 is an example in which a miniaturized device allows analysis of several biological samples simultaneously ("multiplex" analysis). Each sample can also be exposed to several different probes successively. In other words, the device allows an analysis of the "3D analysis" type.

The device described by this document comprises a plurality of channels, into each of which a sample in the liquid phase can be injected independently of the other channels.

Each channel can be formed from several tubular portions. Between two successive portions an approximately cylindrical analysis zone formed in an appropriate matrix is inserted.

The analysis zones can in particular be formed in a flat nitrocellulose matrix, the entire surface of which, except for the analysis zones, is rendered hydrophobic by an impregnation of wax.

The analysis zones can simply consist of untreated nitrocellulose, so that they constitute zones of filtration, or alternatively of nitrocellulose functionalized for example by means of a probe molecule.

The impregnation operation with wax makes it possible to delimit the analysis zones, but also to limit the lateral diffusion inside the matrix (that is to say outside a given analysis zone towards the other neighboring analysis zones) of the molecules of interest (probe molecules or molecules of a sample).

For this impregnation operation, a solid ink printing process is implemented, so as to deposit a layer of wax on the matrix in the areas that must be rendered hydrophobic. At the end of the printing, the matrix is heated to a temperature higher than the melting point of the used wax, then cooled, so that the wax diffuses laterally and in depth, in the thickness of the matrix, so as to limit its subsequent undesirable distribution to the analysis areas.

However, such a process does not make it possible to finely control the volume of a given analysis zone or the shape of the surface which delimits this volume, as shown in the figures presented in this document. In particular, the circumference of the upper surface of a test site varies from site to site and is generally not circular, so that in the direction of flow the section of the analysis area is not precisely the same as the interior section of the channel in which the analysis area is to be inserted.

Consequently, the precision of such a device is limited due to the manufacturing process used to form the analysis zones, and concomitantly, the limit of quantification remains too high for certain biological analyzes in which the concentrations involved (or their variations) are particularly weak.

Document US2004/0115707 discloses a biochemical analysis unit comprising a base plate having a plurality of holes filled with a porous and adsorbent material so as to form a plurality of analysis zones.

The filling of the holes can be obtained by laminating a sheet of adsorbent material on the previously drilled base plate.

During lamination, the sheet of analysis material is stressed anisotropically due to the tensile force exerted in the direction of lamination. The properties of the adsorbent material after insertion into the holes are therefore anisotropic. It is even possible that the thickness of the adsorbent material varies within the same hole.

Moreover, the lamination does not break the continuity of the sheet of adsorbent material. The adsorbent material therefore forms a continuous surface between two channels under or on the plate, as can be observed in FIG. 2b of document US2004/0115707. The molecules of interest (from the sample or probes) therefore risk diffusing from one channel 3 to another due to this continuity.

The precision and sensitivity of a quantitative analysis performed with such a plate are therefore limited.

In another embodiment described by US2004/0115707, the adsorbent material can be dissolved in a solvent. The solution obtained is then injected into the holes and the solvent evaporated. This liquid phase injection technique also does not allow precise control of the isotropy of the properties of the test zone, in particular because the air flow allowing the evaporation of the solvent is necessarily directional.

In addition, traces of solvent may remain in the adsorbent material, which may interact with the probe molecules or molecules to be analyzed. In addition, the use of solvents, in particular organic solvents in the case of nitrocellulose, makes the process polluting.

Finally, the bond between the adsorbent material, once solidified, and the base plate is not ensured with certainty. The quality of this bond depends in particular on the chemical compositions of the adsorbent material and of the base plate. The connection between a given analysis zone and the plate can therefore prove to be fragile. In the event of forced circulation of liquid, by means of a relative vacuum, these analysis zones could come off and be carried away by the circulating liquid. It is therefore not possible to carry out an analysis with forced circulation of liquid through the analysis zones obtained by this embodiment.

Other processes, using different chemicals or a heating step or an irradiation step, for example, are also described in document WO01/19502A2, after a first lamination step.

In addition to the previously exposed disadvantages of lamination, all these embodiments have the disadvantage of causing physico-chemical modifications of the filtering membrane which alter its properties essential for the analysis and therefore the sensitivity and precision of the analysis.

Insofar as the chemical composition and the physical structure of the membrane on which the analysis is implemented influence the performance of the analysis method, and in particular the quantification limit of this method, the invention therefore aims to propose a method for manufacturing a chip for analyzing a biological sample making it possible to finely control this chemical composition and this physical structure.

In particular, the invention aims to provide a method for manufacturing a low-cost analysis chip, not requiring a heat, chemical or irradiation treatment step for the formation of the test sites in the matrix (except during a possible biochemical functionalization of these sites after or before the formation of the sites) and making it possible to carry out a quantitative analysis of high precision and sensitivity and/or an analysis of a biological sample or a simple filtration of a liquid biological sample.

SUMMARY OF THE INVENTION

Thus, the invention relates to a method for manufacturing a biological sample analysis chip comprising:
- providing a matrix formed in a solid support material, having a lower surface and an upper surface and in which at least one through hole extending between said lower and upper surfaces has been formed;
- at least one pad is provided, cut from a sheet of solid and porous analysis material, the pad having a lower surface and an upper surface,
- one proceeds to the insertion of at least one pad in at least one through hole of the matrix by translation of the at least one pad in the direction normal to the lower and upper surfaces of the matrix;
- a mechanical assembly is carried out at a temperature below the melting temperatures of the support and analysis materials, during which a pressing force in the direction normal to the lower and upper surfaces of the matrix is exerted on at least a portion of the matrix which adjoins the at least one pad inserted into the matrix and/or on at least one of the lower and upper surfaces of the at least one pad inserted into the matrix.

Thanks to these provisions, an analysis chip is obtained comprising at least one pad of analysis material inserted into a hole passing through a support material. The assembly between the pad and the support material is not obtained by a chemical process, nor by melting one of the materials so that the physical and chemical properties of the support and analysis materials before assembly are not or at least are very little altered after assembly, including near the interface between these two materials. Assembly is obtained only mechanically and by exerting a pressing force normal to the upper and lower surfaces of the matrix, so that the deformation of the materials is uniform in a plane normal to the direction of the pressing force.

The method therefore makes it possible, unlike methods implementing a lamination step, not to introduce anisotropy into the support material and/or the analysis material in a direction normal to the direction of the pressing force.

Such an anisotropy would, for example, lead in the case of immunological tests using fluorescent reagents to inhomogeneous fluorescence on the surface of an analysis pad, which would make the quantitative analysis of the fluorescence signal imprecise.

Thanks to all of these arrangements, the sensitivity and the reproducibility of an analysis chip obtained by the method according to the invention are therefore improved compared to chips obtained according to the methods of the prior art.

In addition, the means to be implemented are only mechanical, therefore not very polluting in that they do not include solvent and they are simple to implement.

According to various aspects, it is possible to provide one and/or the other of the characteristics below taken alone or in combination.

According to one embodiment, in the method of manufacturing a biological sample analysis chip, the pressing force is exerted on a portion of the matrix which adjoins the at least one pad inserted into the matrix.

Thanks to this arrangement, this portion of the matrix can be folded over and/or below the pad so that the pad can be at least partially crimped by the matrix. Thus, the assembly of the pad to the matrix in the analysis chip will present a good mechanical resistance and will not be affected by the flow of a liquid sample to be analyzed in the direction normal to the upper and lower surfaces of the matrix, or even by a relative vacuum applied on the side of one of these surfaces in order to accelerate the flow of the liquid sample.

According to one embodiment of the method for manufacturing a biological sample analysis chip, the pressing force is exerted on at least one of the lower and upper surfaces of the at least one pad inserted into the matrix.

Thanks to this arrangement, the pad at least partially crimps the matrix so that the assembly of the pad to the matrix will present a certain mechanical resistance and it will not be affected by the flow of a liquid sample to be analyzed in the direction normal to the upper and lower surfaces of the matrix, or even by a relative vacuum applied on the side of one of these surfaces in order to accelerate the flow of the liquid sample.

According to a particular embodiment, in the method of manufacturing a biological sample analysis chip, the support material is hydrophobic and the analysis material is hydrophilic or vice versa. In this way, it is for example possible to deposit on the pad a sample to be tested in aqueous phase without it diffusing towards the support material if the latter is hydrophobic. Conversely, if the support material is hydrophilic, the analysis material is hydrophobic and it is then possible to deposit a sample to be tested in the organic phase on the pad without it diffusing towards the support material.

According to a particular embodiment, in the method of manufacturing a biological sample analysis chip, for inserting the at least one pad into the at least one through hole, the at least one pad is translated into the at least one through hole by means of a punch, the at least one pad having been cut out from the sheet of analysis material before its insertion by means of this same punch and the at least one through hole having been formed beforehand in the matrix by means of this same punch.

Thanks to this arrangement, a single tool is necessary to prepare an analysis chip, namely a tool having one or more punches of sizes and shapes adapted to the shapes of the desired wells. Such a tool is simple to design and implement and possibly allows automation of the process, which makes it possible to obtain high and controlled precision analysis chips in a reproducible, rapid and low-cost manner.

According to a particular embodiment, in the method of manufacturing a biological sample analysis chip, after the mechanical assembly, the at least one pad is functionalized.

One can for example consider a biochemical functionalization, by means of an antibody or an antigen which is adsorbed on the pad.

In this way, the biological sample analysis chip obtained by the method makes it possible to implement an analysis test implementing the reagent used for the functionalization, for example an immunological test. The analysis chip can therefore be adapted to the analysis needs thanks to this functionalization step. The analysis chips can for example be produced in series before the functionalization step and each functionalized at will at the time of the analysis.

According to a particular embodiment, in the method of manufacturing a biological sample analysis chip, the analysis material is functionalized before inserting the at least one pad into the matrix.

Thanks to this arrangement, the functionalization can be done on the whole of a sheet of analysis material before cutting the pad. This saves time when the analysis chips are prepared in series. The control of the functionalization, and in particular of a quantity of analysis reagent deposited on each pad, is also better, which ultimately allows better precision and better reproducibility of the tests carried out with a given series of analysis chips.

According to a particular embodiment, in the method of manufacturing a biological sample analysis chip, the insertion of the at least one pad into the matrix is repeated at least once, using for each new insertion a functionalized analysis material different from that used for the previous insertion and a punch corresponding to at least one through hole of the matrix different from that used for the previous insertion.

Thanks to this arrangement, it is possible to form several differently functionalized analysis pads on the same analysis chip. It is then possible to carry out several different tests simultaneously on the same chip, on the same sample or on several different samples. The process remains simple to implement since it only requires different punches or equivalently a single tool provided with several punches positioned at different places and which can be activated separately or in groups. According to a particular embodiment, in the method of manufacturing a biological sample analysis chip, the mechanical assembly of at least one pad with the matrix results in crimping of at least one pad on at least a portion of its lower and upper surfaces by the matrix.

Thanks to this arrangement, the pad cannot be pushed, under normal conditions of use, outside the matrix at least on one side of this matrix. The assembly of the matrix and the pad therefore resists a relative vacuum or the pressure exerted on one side of the pad by the sample to be tested when it is deposited.

According to a particular embodiment, in the method of manufacturing a biological sample analysis chip, before the insertion of the at least one pad into the matrix, the at least one pad is brought to a temperature lower than that of the matrix. Thanks to this arrangement, the analysis material shrinks before its insertion, which facilitates its insertion into the through hole by reducing the contact forces and it expands after insertion, so that after insertion, the contact between the pad and the matrix is secured and allows the pad to be held in place in the matrix.

The invention also relates to a biological sample analysis chip comprising:
  a matrix formed in a solid support material, having a lower surface and an upper surface and in which at least one through hole extending between said lower and upper surfaces has been formed;
  at least one pad, cut from a sheet of solid and porous analysis material and inserted into the at least one through hole, the at least one pad having a lower surface and an upper surface, the biological sample analysis chip being characterized in that the at least one pad is crimped on at least one of its upper and lower surfaces by the matrix.

Such an analysis chip has the advantage of not containing any residue of solvent or melting or soldering zone which could alter the precision of a test carried out with this chip. Crimping makes it possible both to preserve the native physico-chemical properties of the support material and of the analysis material. It also makes it possible to carry out a test with flow of a sample along the axis of the through hole from one side of the pad to the other, since the assembly between the pad and the matrix has good mechanical resistance.

According to one embodiment of the biological sample analysis chip sample, the support material comprises at least one component chosen from a metal, a plastic material and cellulose and in that the analysis material of which the at least one pad is formed includes at least one component selected from nitrocellulose, cellulose, and an organic polymer.

Such materials are inexpensive and have the necessary qualities of biochemical inertness and adsorption to implement analyzes such as biochemical tests.

According to one embodiment of the biological sample analysis chip, the assembly of the at least one pad and of the matrix withstands at least a relative vacuum equal to 0.100 bar.

Thanks to this arrangement, it is possible to implement an analysis on a sample flowing in a forced manner through the pad without the pad separating from the matrix due to the overpressures which are exerted locally.

The invention also relates to a device for analyzing a biological sample comprising at least two superposed biological sample analysis chips according to one of the preceding embodiments and in which the at least one pad of one of the at least two chips is configured to perform a filtration function and is superimposed with the at least one functionalized pad of another chip of the at least two chips.

It is thus possible to stack several analysis chips to obtain a three-dimensional analysis device, the analysis carried out varying from one analysis site to another in the direction of the stacking and/or within a given analysis chip and to carry out a first filtration step before the analysis, in particular to separate the serum from the red blood cells with a view to analyzing a blood sample.

In the latter case, the device makes it possible to avoid a centrifugation step.

The invention further relates to a diagnostic kit comprising at least one biological sample analysis according to one of the preceding embodiments and at least one analysis reagent.

One or more analysis reagents, in particular a buffer, a solvent, an antigen, an antibody, can thus be provided in order to carry out a standardized test, such as an immunological test.

The invention also relates to the use of a biological sample analysis chip according to one of the preceding embodiments for diagnostic purposes or for an immunological test.

The invention finally relates to a device for manufacturing a biological sample analysis chip according to one of the preceding embodiments, the manufacturing device comprising:
  an insertion system suitable for inserting the at least one pad into the at least one through hole of the matrix by translation of the pad in the direction normal to the lower and upper surfaces of the matrix;

a mechanical assembly system at a temperature below the melting temperatures of the support and analysis materials, adapted to exert a pressing force in the direction normal to the lower and upper surfaces of the matrix on at least a portion of the matrix which adjoins the at least one pad inserted into the matrix and/or onto at least one of the lower and upper surfaces of the at least one pad inserted into the matrix.

Such a manufacturing device is simple to implement and introduces only minimal and isotropic deformation of the support and/or analysis material in any plane parallel to the lower and upper surfaces of the matrix. It therefore makes it possible to form analysis chips at low cost and while preserving the native physico-chemical properties of the support and analysis materials.

BRIEF DESCRIPTION OF DRAWINGS

Embodiments of the invention will be described below with reference to the drawings, briefly described below:

FIG. 3*a*1 represents a support matrix portion at the beginning of the drilling of a through hole, seen in section along a plane containing the axis of this hole, according to a particular embodiment.

FIG. 3*a*2 represents a support matrix portion in which a through hole is being drilled, seen in section along a plane containing the axis of this hole, according to a particular embodiment.

Figure 1:
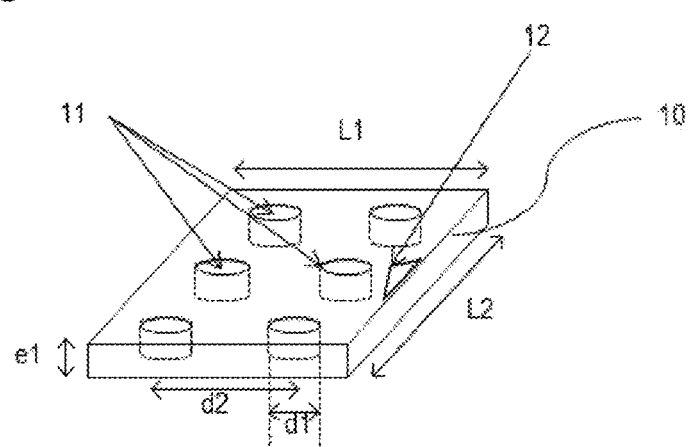
FIG. 1 shows one embodiment of a support matrix for an analysis chip.

In the drawings, identical references designate identical or similar objects.

Figure 7:
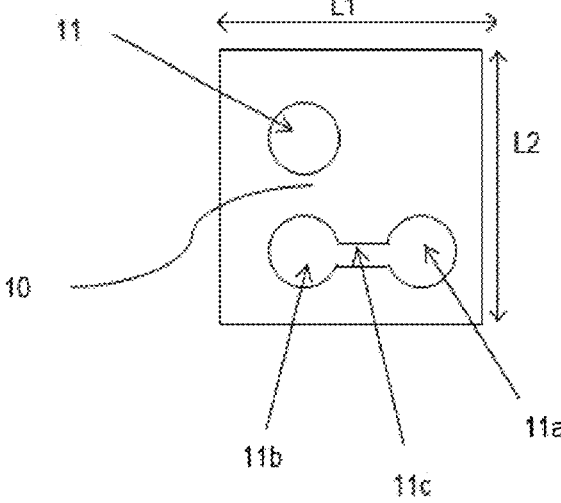

FIG. 7 represents a top view of an embodiment of an analysis chip support matrix, in which the through holes have different shapes.

Figure 8A:
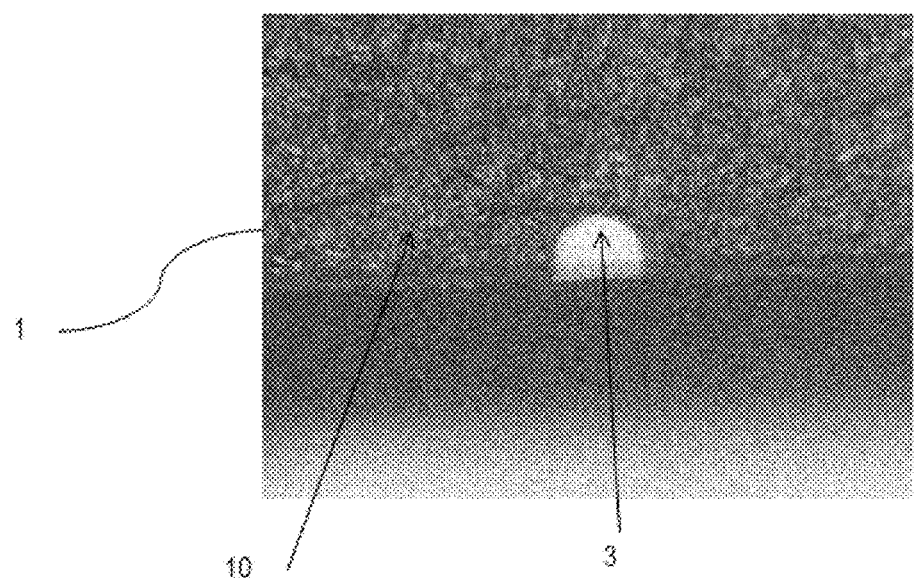

FIG. 8*a* presents a photograph obtained with a binocular magnifying glass (Zeiss, Stemi SV8 model) of a biological sample analysis chip 1 cut out along a plane orthogonal to the upper and lower faces of the chip and containing a diameter of the circular section of a cylindrical through hole.

Figure 8B:
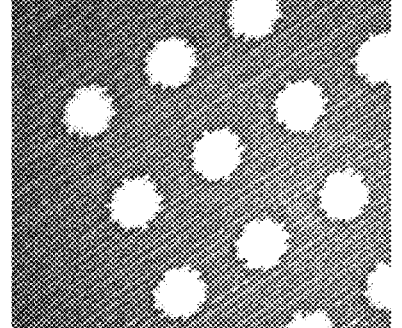

FIG. 8*b* reproduces a photograph of an analysis chip obtained with a method of the prior art implementing a Xerox® Solid Ink printer, the diameter of the analysis pads being of the order of 500 micrometers.

Figure 8C:
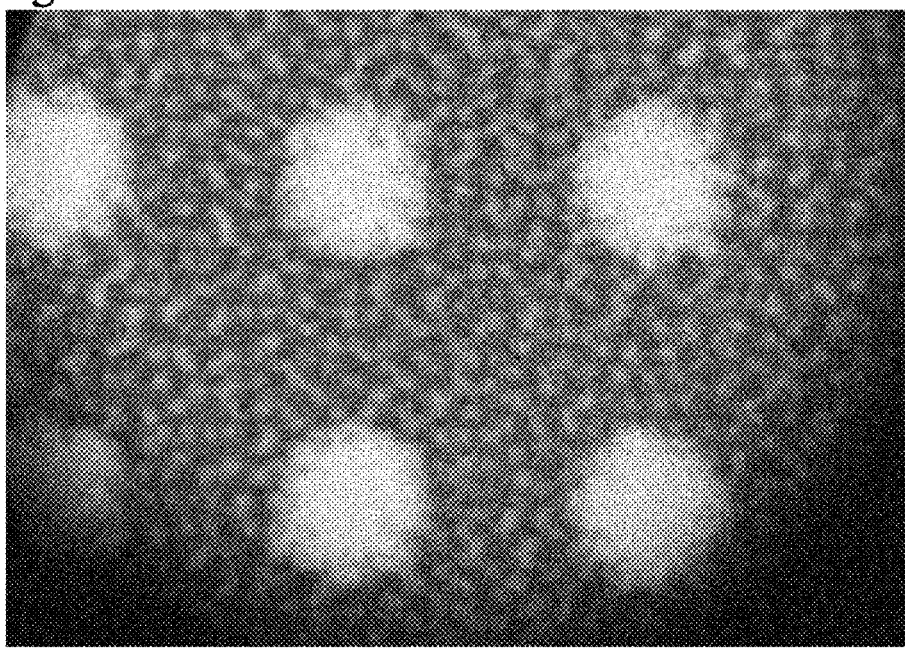

FIG. 8*c* presents a photograph of the analysis chip of FIG. 8*b* obtained with a binocular magnifying glass (Zeiss, model Stemi SV8, magnification ×64).

Figure 8D:
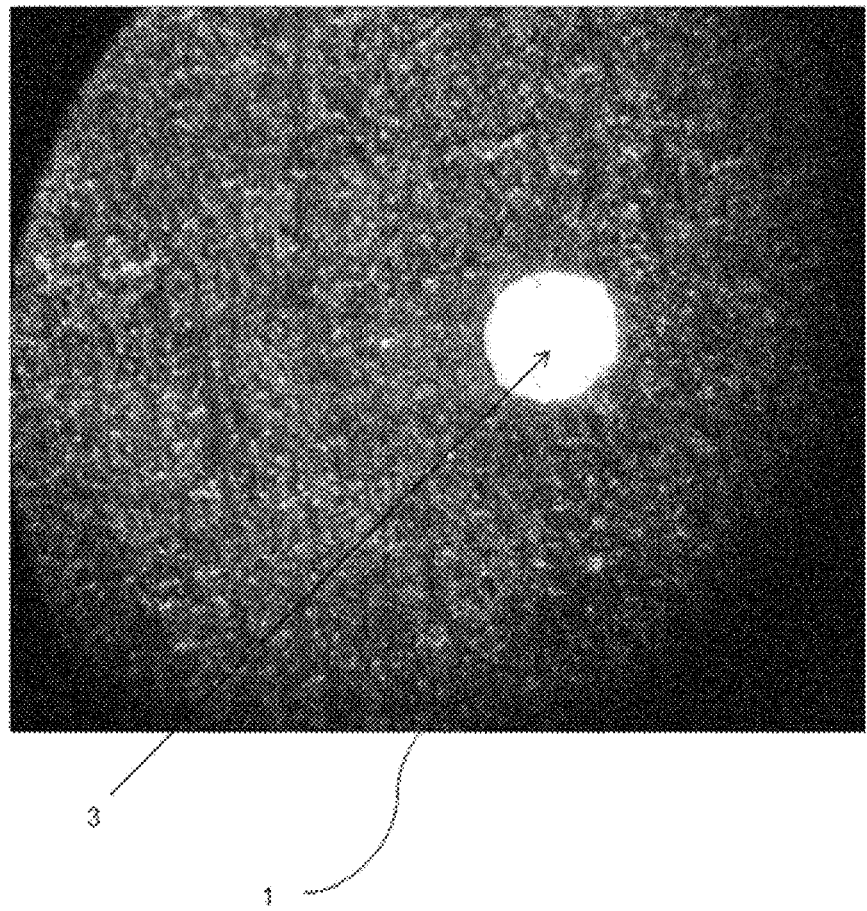

FIG. 8*d* presents a photograph of the analysis chip of FIG. 8*a* obtained with a binocular magnifying glass (Zeiss, Stemi SV8 model, magnification ×64) obtained by the method according to the invention, in which the analysis material is nitrocellulose, the backing material of the black paper coated with wax, the diameter of the analysis pads being equal to 500 micrometers.

Figure 9:
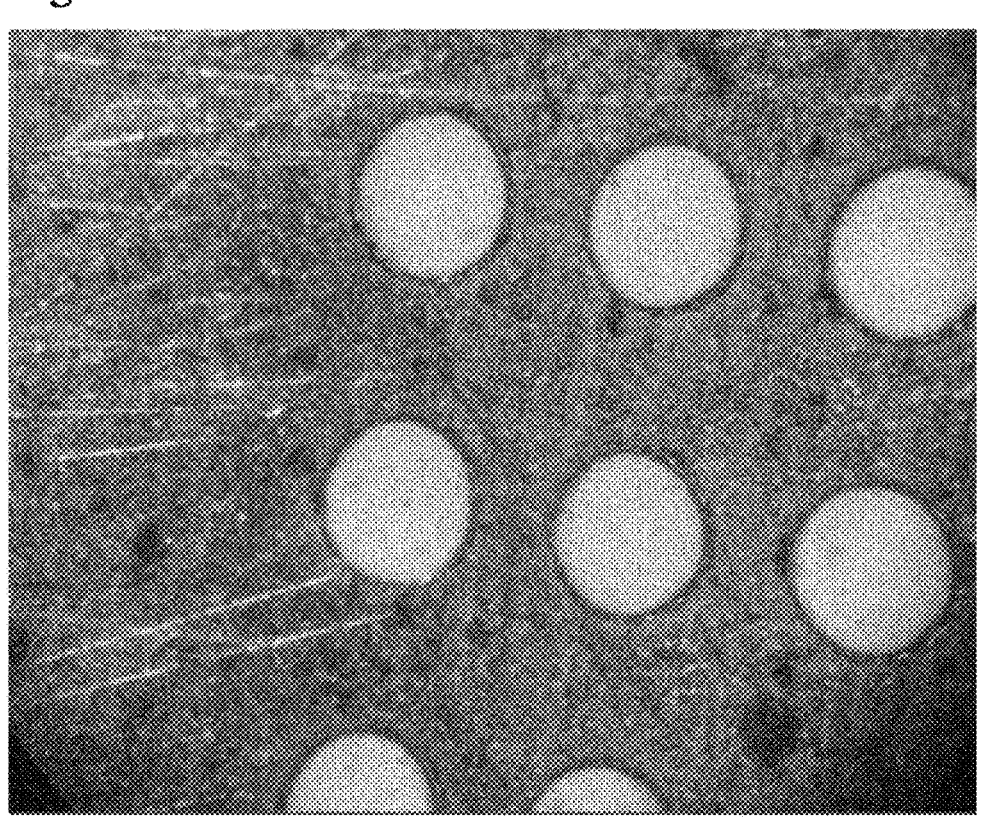

FIG. 9 presents a photograph of an analysis chip obtained with a binocular magnifying glass (Zeiss, Stemi SV8 model, magnification ×64) obtained by the method according to the invention, in which the analysis material is nitrocellulose, and the support material is brass, the diameter of the analysis pads being equal to 500 micrometers.

DETAILED DESCRIPTION

The invention relates to a method for manufacturing a biological sample analysis chip 1 intended to be implemented in isolation or in an analysis device 7. The analysis device 7—or the biological sample analysis chip 1 on its own—makes it possible, for example, to carry out analyzes of biological liquids such as blood or a liquid fraction of blood (plasma, serum), the urine, saliva, etc.

The analyzed liquid can also be a reaction medium comprising bio-molecules such as antibodies or proteins.

The notion of analysis of a biological sample must therefore be understood in the broad sense, i.e. it is an analysis involving at least one biomolecule among the reagent(s) and/or the analytes.

The biological sample analysis chips 1 can thus be used to detect and quantify complex biomolecules in biological media: blood, plasma, serum, organs or organ extracts, reaction medium in which complex biomolecules are produced (antibodies, proteins).

In particular, the biological analysis can be an immunological test such as an ELISA ("Enzyme-Linked Immunosorbent Assay") test.

The biological sample analysis chips 1 can still be implemented in the field of the food industry for the search for pathogenic agents, for example during health checks.

The method for manufacturing a biological sample analysis chip 1 according to the invention comprises:

the provision of a support matrix 10 formed in a solid material, called "support material", having a lower surface and an upper surface and in which at least one through hole 11 has been formed extending between its lower and upper surfaces;

the supply of at least one pad 3 cut from a sheet of a second porous solid material, called "analysis material", the at least one pad 3 having a lower surface and an upper surface;

the insertion of at least one pad 3 in the at least one through hole 11 of the support matrix 10 by translation of the at least one pad 3 in the direction normal to the lower and upper surfaces of the matrix 10;

cold mechanical assembly, at a temperature below the melting temperatures of the support and analysis materials, during which a pressing force in the direction normal to the lower and upper surfaces of the matrix 10 is exerted on at least a portion of the matrix 10 which adjoins the at least one pad 3 inserted into the matrix 10 and/or on at least one of said lower and upper surfaces of the at least one pad 3 inserted into the matrix 10.

The biological sample analysis chip 1 obtained at the end of the process comprises:

a matrix 10 formed in a solid support material, in which at least one through hole 11 has been formed;

at least one pad 3, cut from a sheet of solid and porous analysis material and inserted into the at least one through hole 11, the at least one pad 3 being crimped on at least one of its upper and lower surfaces by matrix 10.

Figure 2:
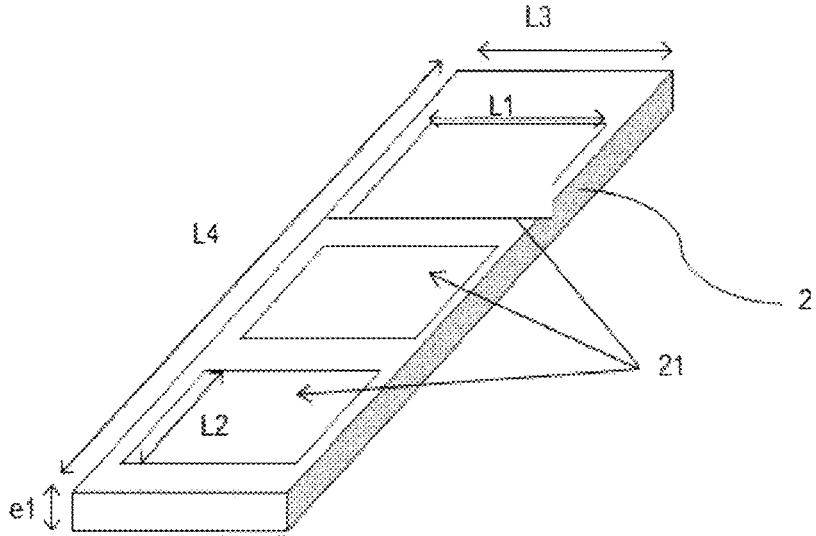
FIG. 2 shows a support strip in which three basic parts each allowing to form a support matrix have just been cut.
Figure 5:
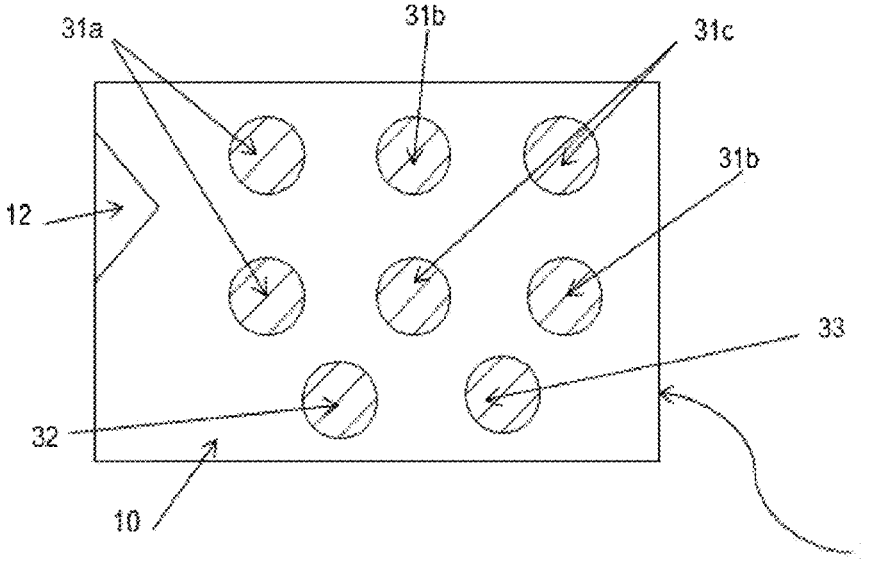
FIG. 5 shows a top view of one embodiment of an analysis chip.

The biological sample analysis chip 1, which can be observed in a particular embodiment in FIG. 5, therefore comprises a support matrix 10 formed in a solid material of thickness e1 in which one or more through holes 11 were formed. A particular embodiment of the support matrix 10 is shown in FIG. 1. Another particular embodiment of the support matrix 10 is represented in FIG. 7. As shown in FIG. 2, the support matrix 10 is formed by cutting out a base part 21, of suitable shape for the analysis device in which it is intended to be used or else for its use in isolation. The base part 21 is for example a rectangular or square parallelepiped cut from a support strip 2 of a solid material, later called "support material", having a lower surface and a flat upper surface parallel to each other.

A base part 21 cut from the support strip 2 to form a support matrix 10 can be a parallelepiped and have a width L1 of between 5 mm (5 millimeters) and 50 mm and a length L2 of between 5 mm and 50 mm.

In a particular embodiment, the support matrix 10 is formed in an analysis material of constant thickness e1 between the lower surface and the upper surface, these surfaces being in this case flat and parallel to each other.

The thickness e1 of the support strip 2 is then constant and identical to that of the cut part 21. It is preferably smaller, for example by at least a factor of ten, than the other dimensions (length L1 and width L2) of the cut part 21.

The support strip 2 can for example have a width L3 either identical to or slightly greater than the width L1 of the support matrix 10, or for example greater than twice the width L1.

In the latter case, it is possible to cut out several base parts 21 in the width of the support strip 2.

The width L3 of the support strip 2 is thus for example between 5 mm and 50 mm.

The length L4 of the support strip 2 can be greater, or even much greater, than the length L2 of the part 21. The length L4 for example greater than 1 m or even 10 m.

In this way, it is possible to successively cut out several basic parts 21 in the support strip 2. The cutting of a base part 21 can for example be carried out by means of a cutter in which the support strip 2 is inserted.

If the support strip 2 is long enough, the cutting of the base parts 21 can be automated, the support strip 2 being translated by an adequate distance between two successive cuts of a base part 21.

The thickness e1 of the support strip 2 (and of a base part 21 cut from this support strip 2) can be less than 1 mm, less than 0.15 mm, or even less between 0.1 mm. For example, the thickness e1 of the support strip can be equal to 0.06 mm.

In a particular embodiment, the support strip 2 has a width of 20 mm and a length of 25 m for example. The width and length can be changed according to the type of analysis chips 1 to be manufactured. The thickness of the support strip 2 can be equal to 0.12 mm, i.e. the current thickness of the filtering membranes (generally made of nitrocellulose) formed in the analysis material, but it could also be of the order of 0.10 mm.

In a particular embodiment, a base part 21 is a square filtering membrane with sides of 20 mm.

The support strip 2 can in particular be made of metal, for example steel, copper or brass. The support strip 2 can, in an alternative embodiment, be made of plastic. By way of non-limiting example, the plastic material can be polyethylene, polyvinyl chloride, polystyrene, polymethyl methacrylate, polypropylene or any other plastic material commonly used in the field of biochemical analyses. It may have undergone a surface treatment or be UV resistant.

The support material may also contain vegetable fibres, for example cellulose. It may in particular be paper.

The support material is strong but not necessarily rigid. The support strip 2 can thus have a certain flexibility, provided that the support strip 2 or a support matrix 10 formed from this support strip 2 can be manipulated and moved for the preparation of the analysis chips 1, in particular without tearing, including the case where the preparation of the support matrix 10 is automated. By way of example, Rex Copy A4 photocopier paper distributed by Mondi®, with a weight of 80 g/m2, available on the priority date of this patent application, is suitable for the invention.

In the case where the support strip 2 is flexible, the material is sufficiently rigid for the upper and lower surfaces to be effectively flat when the lower surface is, at least locally, simply placed on a flat support.

In one embodiment, the support material is rigid enough to allow the cutting of one or more base parts 21 by means of a cutter. In a base part 21 of support material, at least one through hole 11 is formed through the material in its thickness, that is to say along the direction normal to the lower and upper surfaces of the part 21.

In a particular embodiment, a through hole 11 is formed by means of a punch 42, as shown in FIGS. 3a1 (at the start of drilling), 3a2 (during drilling), and 3b (just before the injection step that follows the drilling step, described later). In this embodiment, the punch 42 is translated along the direction of the axis of the future through hole 11, so as to pierce the support matrix 10. A dedicated cutting guide 4 can be placed under support strip 2. The stroke of the punch 42 through the cutting guide 4 is adjusted so as to allow the ejection of a pad 10b from the support strip 2, as can be seen in FIGS. 3a1 and 3a2.

The punch can then be moved in the opposite direction so as to release the support matrix 10 then comprising one or more through holes 11.

In a particular embodiment, the through holes 11 are formed on the locations corresponding to the future base parts 21 in the support strip 2 before one or more base parts 21 are cut out.

In another embodiment, the through holes 11 are formed in a base part 21 already cut out.

Alternatively, the through holes 11 are formed at the same time as the part 21 is cut, for example by means of a cutter of suitable shape.

The shape of the through holes 11 can be chosen according to the needs of the analysis. For example, the surface delimiting the interior of a through hole 11 is a cylinder whose generatrix is parallel to the direction normal to the lower and upper surfaces of the part 21, direction which will be referred to below as the "axis of the hole". 11. For example, the through holes 11 are cylinders of revolution.

In the embodiment represented in FIG. 7, one of the through holes 11 can be analyzed as formed by two through sub-parts of circular section 11a and 11b, connected by a channel 11c. Once the pads of analysis material have been inserted as described below, it will thus be possible to deposit the sample to be analyzed in the well corresponding to the first "sub-hole" and to let the sample diffuse from the sub-part 11a to subsection 11b. In this case, it is possible to use the analysis chip to perform a lateral flow type test.

The characteristic dimensions of a through hole 11 in a direction of the upper or lower surface of the part 21 in which the through hole 11 is formed may be less than 1 mm.

For example, a support matrix 10 can comprise 9, 12, 24, 48 or 96 holes (or wells) 11 having the shape of cylinders of revolution with a diameter d1 of the order of 300 to 800 μm (micrometers), two successive through holes 11 being spaced apart by a distance d2 of the order of 100 to 250 μm.

Optionally, a cutout or a reference mark 12 is formed on the support matrix 10 so as to be able to identify its orientation, in particular during an analysis which will be carried out later. This arrangement makes it possible to differentiate the through holes 11 from each other when the support matrix 10 has elements of symmetry.

At the end of the step of drilling a through hole 11, the lower and upper faces of the support material are no longer strictly flat near the lower and upper bases of the through hole 11 but an overhang 10a of support material is formed over the entire circumference of a through hole 11 on the side of the underside of the support material, due to the resistance that the support material opposes to its cutting. This overhang 10a, which can be seen in FIG. 3a2, will be used during the subsequent assembly step.

In the first step of the method according to the invention, a support matrix 10 is therefore provided, formed in a support material of constant thickness e1 between a lower surface and an upper surface in which one or more holes 11 passing through it in its thickness have been formed.

In a second step, a sheet 6 of constant thickness, denoted e2, of a second porous solid material called "analysis material" is provided, having an upper surface and a lower surface.

The analysis material is intended to receive on one of its lower and upper surfaces a liquid sample to be analyzed or filtered, which must then be able to flow towards the other of these surfaces, either spontaneously by simple diffusion, or due to forced circulation of the liquid. The analysis material can therefore be a porous material such as paper, in particular filter paper, that is to say paper with a high alpha-cellulose content (in particular more than 90%, 95%, or even 98% of alpha-cellulose).

The analysis material can also be nitrocellulose.

Nitrocellulose has a good affinity for small proteins, peptides or nucleic acids. It is therefore particularly well suited for biological analyses. These examples should not, however, be considered as limiting.

The material for analysis can be chosen in particular according to its resistance to humidity, its filtration rate, its breaking strength, its rate of capillary rise or its resistance to the passage of air.

In the case where the liquid to be analyzed mainly contains water, the analysis material is preferably hydrophilic, so that the liquid to be analyzed wets the surface of the analysis material. In this case, the support material can be hydrophobic.

In the following, we will consider that a material is hydrophobic if the water does not wet the material, i.e. if the angle between a drop of water and the surface of the material on which the drop is deposited is strictly greater than 90°. Otherwise, the analytical material is hydrophilic.

Alternatively, the analysis material can be hydrophobic and the support material hydrophilic.

The analysis material can be an isotropic or anisotropic filter membrane. In particular, it may be an organic filter membrane, that is to say a membrane comprising an organic polymer such as cellulose acetate, a polysulfone or a polyamide.

The thickness e2 of the analysis material can be close to the thickness e1 of the support material. The thickness e2 can be greater than, equal to or less than the thickness e1.

In the case where the support material is nitrocellulose, the thickness e2 of the analysis material may thus be of the order of a few hundreds, or even a few tens of micrometers, for example 50 μm to 150 μm.

In a third step, called injection, a portion of the analysis material, called pad 3, is inserted into at least one through hole 11 of the support matrix 10, so that the pad 3 closes this hole 11.

A pad 3 is therefore complementary to a hole 11 in which it must be inserted over at least part of the thickness of the support material. In other words, if the surface delimiting the interior of a through hole 11 is a cylinder whose generatrix is parallel to the direction normal to the lower and upper surfaces of the part 21, a pad 3 which can be inserted therein is a cylinder whose generatrix is parallel, after insertion, to the axis of the through hole 11 whose base has the same shape as the base of the through hole 11.

The term "pad" should therefore not be interpreted in a limiting manner in terms of shape. It was chosen in relation to the easiest embodiment to implement, that is to say the one for which the through hole 11 and the pad 3 are cylinders of revolution.

Thus, in the embodiment shown in FIG. 7, the pad 3 inserting into the through hole 11 formed of two sub-parts 11a, 11b and a channel 11c will have the complementary shape adapted to fill the sub-parts 11a, 11b and 11c, while the pad 3 fitting into the cylindrical through hole 11 will be cylindrical.

Figure 4A:
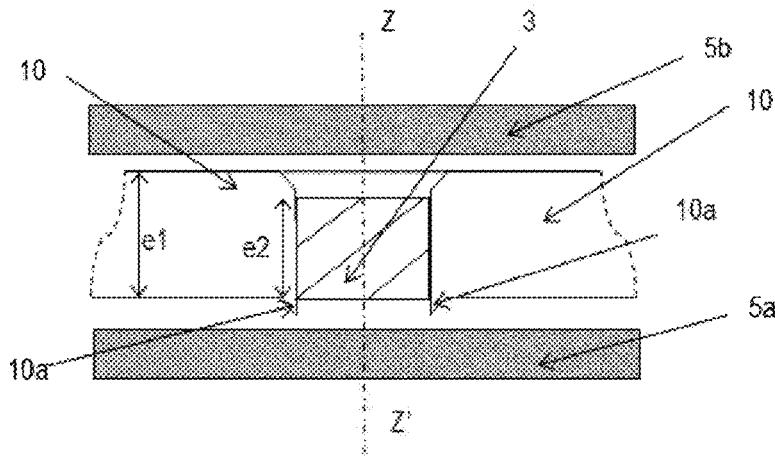
FIG. 4*a* shows a sectional view of the same support matrix portion as in FIG. 3*d* at the start of the assembly step in a particular embodiment.
Figure 4B:
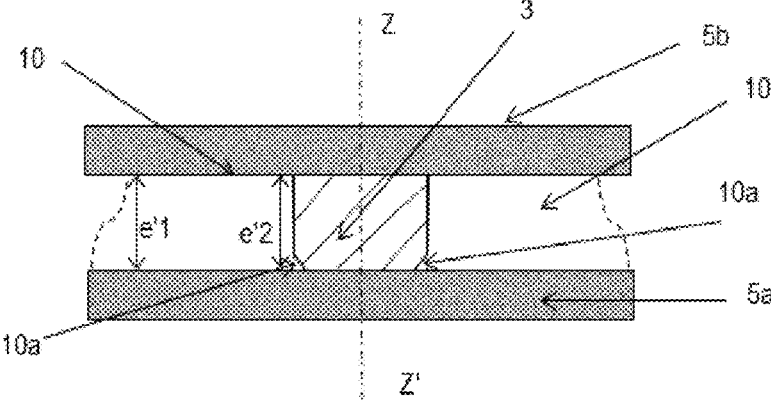
FIG. 4*b* shows a sectional view of the same support matrix portion as in FIG. 3*d* during the assembly step in a particular embodiment.
Figure 4C:
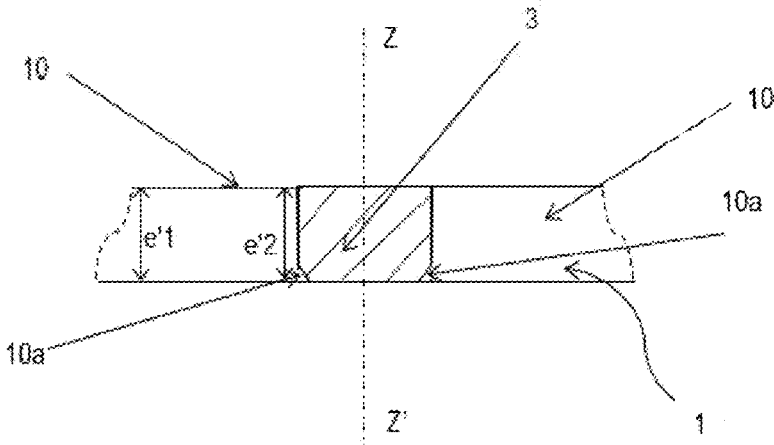
FIG. 4*c* shows a sectional view of the same support matrix portion as in FIG. 3*d* at the end of the assembly step in a particular embodiment.

The height of the pad 3 can in all cases be equal to the height of the hole 11 (as seen in the sectional view along a plane containing the axis of the through hole 11 shown in FIG. 4c) or different from this (see FIG. 9 which shows an analysis chip 1 according to the invention, the support material of which is brass coated with Le Parfait® food paraffin (reference 365 EMB 44 026, packaging 250 g) and the material for nitrocellulose analysis (Reference: Amersham Protran® Premium pores 0.45 μm NitroCellulose, GE Healthcare Life Science Nitrocellulose Bloting Membrane Nucleic acid and Protein application Catalog No 10600008).

The interlocking carried out during the insertion step is obtained only by translation of the pad 3 along the axis of the through hole 11. For example, if the through hole 11 was formed in the base material using a punch, the support matrix 10 may remain in place under the punch 42 after the hole 11 has been drilled.

Figure 3B:
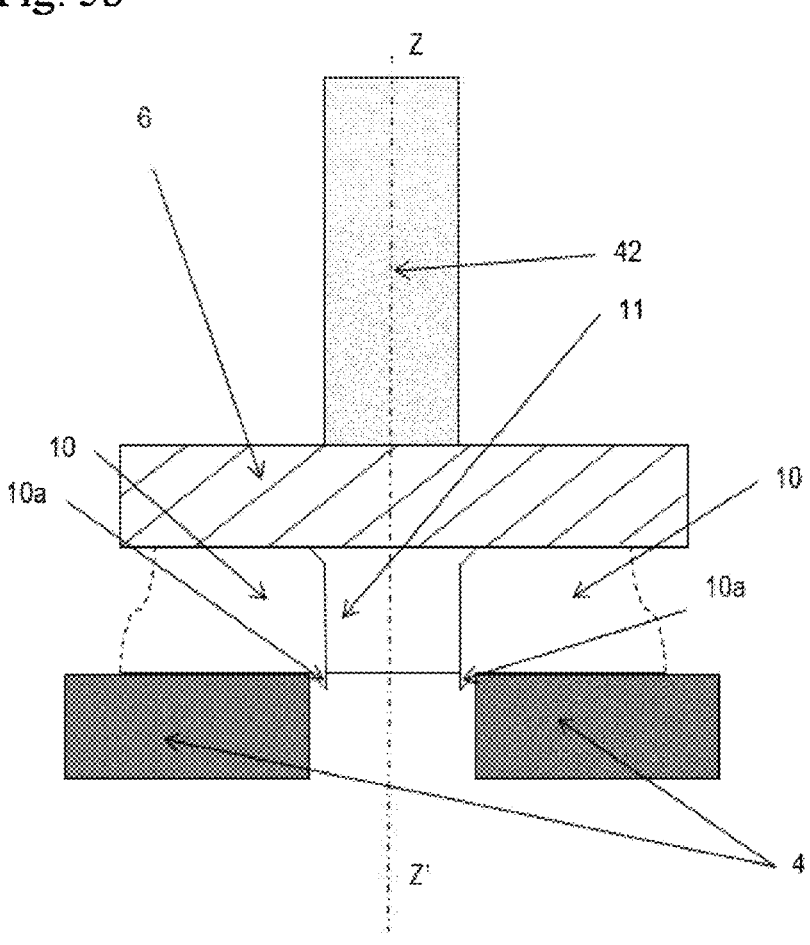
FIG. 3*b* represents a portion of support matrix, after drilling a through hole and at the start of a step of inserting a pad of analysis material, seen in section along a plane containing the axis of this hole, according to a particular embodiment.

A sheet 6 of analysis material is then placed above the pierced support matrix 10, as shown in FIG. 3b and the punch 42 is again moved along the axis of the hole at a distance at least slightly lower than that which made it possible to drill the hole 11.

In this way, the punch 42 cuts out the pad 3 to be inserted and drives it along its path inside the through hole 11, but without it coming out completely from the through hole 11 on the side of the lower surface of the support matrix 10 and so that it is positioned above at least part of the overhang 10a.

At the end of this insertion step, the pad 3 is therefore well fitted, at least over part of its height, in the through hole 11.

Figure 3C:
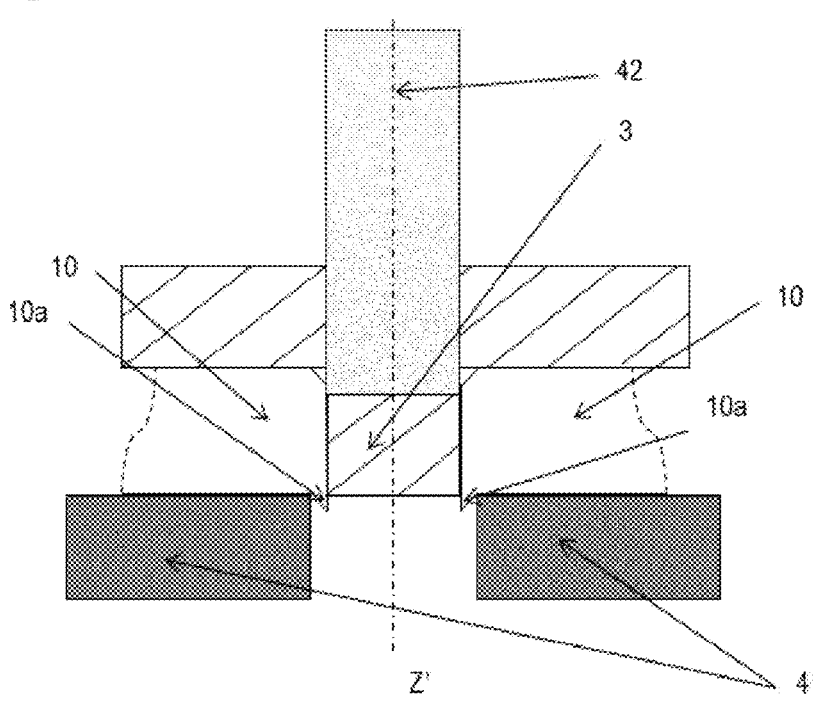
FIG. 3*c* represents a portion of support matrix during insertion of a pad of analysis material, seen in section along a plane containing the axis of this hole, according to a particular embodiment.

The choice of the stroke of the punch makes it possible to position the pad 3 at a chosen height in the concerned through hole 11, for example so that the lower base of the pad 3 is in the same plane as the lower surface of the support matrix 10 or at least the lowest points of the overhang 10a, as shown in FIG. 3c.

It is also possible to use a punch dedicated to the insertion step, for example in an embodiment in which the production of the matrices is automated and carried out much before the insertion step.

It is also possible to provide one or more pads 3 cut out in advance, for example by means of a cutter or any other precision cutting tool and to insert them into the through hole 11 which corresponds to them by a vertical translational movement.

The embodiment in which the cutting and the insertion are carried out consecutively with the same punch has the advantage of the simplicity of the positioning of the pads and the speed of carrying out this step.

In the latter case, a punch tool and two corresponding counter pieces are provided in order to be able to suitably perforate the support strip 2 and thus make the wells (or even "spots", or even through holes 11) in the support strip 2 first. This tool may in particular be made of steel so that its rigidity and its resistance over time are guaranteed. The dimensions of this tool will be adapted to the types of analysis chips 1 to be produced.

In a particular embodiment, 25 through holes 11 of 500 micrometers in diameter are formed spaced 200 micrometers apart, contained in a 6 mm×6 mm square placed in the center of a base part 21 in the shape of a square of support material (20×20 mm).

The punch tool will therefore have 25 punches with a diameter of 500 micrometers. For other configurations of the biological sample analysis chip 1, the punches used for all the through holes 11 or for part of these through holes 11 may have different diameters. The diameter (or a characteristic dimension in the case where the section of the through hole 11 is not circular) of the punch may thus be less than 1000 micrometers, less than 900 micrometers, less than 800 micrometers, less than 700 micrometers, less than 600 micrometers, less than 500 micrometers, less than 400 micrometers, less than 300 micrometers, less than 200 micrometers, less than 150 micrometers, less than 100 micrometers.

The "punches as well as two counter-pieces" assembly can be fixed under a press, between the jaws 5a and 5b of this press. The support strip 2 unrolls automatically in the lower part of the first counterpiece and adjusted in the middle of this "punch; first counterpart; second counter part" in order to make wells (through holes 11) automatically by simple movement from top to bottom in the intended place. As soon as this first stamping is finished, the strip of analysis material is introduced above the second counterpart, once the punch has returned to the "high" position. A second stamping (this time of the analysis material, forming the filter membrane) is then carried out, allowing the cutting of pads 3 of this analysis material, for example a filter membrane.

The downward stroke of the punches of the cutter can then, for example, be adjusted for this second stamping in such a way that in the low position, the punch stops at the start of the already pierced support strip 2. In this way the punches will push the freshly cut pads 3 of analysis material, for example nitrocellulose, and insert them into the through holes 11 so as to fill, at least partially, these through holes 11 of the support matrix (or membrane).

This being done, the strip can advance under a second press which has the function of crimping the pads of analysis material, for example of nitrocellulose, in the support strip 2, or at least in the support matrix 10, by a shock (pressure) which can be exerted on the entire surface of the membrane in order to properly block the pads in the support strip, as described below. The strength of this pressure or (shock) can be determined by testing.

Whatever the embodiment chosen for the injection step, the insertion is done if possible only by translation of the pad 3 along the axis of the concerned through hole 11, so as to keep the properties of the analysis material unchanged during this step. In particular, the method according to the invention has the advantage of not implementing any step which could introduce an anisotropy of the properties of this material and thus degrade the precision and sensitivity of the analysis, as discussed previously for a step of lamination.

Furthermore, in the case where the support matrix 10 comprises at least two pads 3 inserted in at least two different through holes 11, these pads 3 are not connected by a portion of analysis material. Consequently, if the analysis material is chosen sufficiently different from that of the support material, it is unlikely that the molecules which adsorb on a given pad 3 risk migrating to a neighboring pad 3.

In the same way, if the liquid to be analyzed wets the pad 3, by choosing a support material of hydrophobicity different from that of the analysis material, it is possible to limit, or even avoid, the lateral diffusion of the liquid to be analyzed. from a pad 3 to the support material—and possibly to another pad 3.

Thus, if the sample to be analyzed is an aqueous solution, a hydrophilic analysis material and a hydrophobic support material can be chosen.

It is also possible to envisage a hydrophilic support material and pads 3 of hydrophobic analysis material in the case where the sample to be analyzed is an organic phase immiscible with water.

This step of injection only by a translational movement along the axis of the hole 11 makes it possible, while respecting the physico-chemical properties of the support and analysis materials, to obtain at the end of the complete process an biological sample analysis chip 1 allowing qualitative analyzes of high sensitivity.

In a particular embodiment, the support matrix 10 has at least two through holes 11 and a first pad 3 is inserted into one of the through holes 11 before another pad 3 is inserted into another through hole 11.

In this case, at least two different cutters are consecutively used.

This embodiment makes it possible to insert into two different through holes 11 two pads 3 formed in different analysis materials.

For example, it is possible to prepare at least two sheets of initially identical analysis material but each having undergone a different bio-functionalization step, in particular by adsorption of two different antigens.

A pad 31a on which a first antigen has been adsorbed can be inserted into a first through hole 11 of a support matrix 10 and another pad 31b on which a second antigen has been adsorbed can be inserted into a second through hole 11 of the support matrix 10.

In this case, a cut-out or reference mark 12 optionally formed on the support matrix 10 can make it possible to identify the positions of the various test sites.

In the case where the management of the bio-functionalization is done on the scale of the sheet of material for analysis, rather than pad 3 by pad 3 on a given chip and/or on successive chips, it is possible to produce identical analysis chips in series with a high yield, which present identical analytical qualities, making it possible to work under conditions of satisfactory repeatability, even reproducibility. The limit of quantification, i.e. the smallest concentration or content of the analyte that can be quantified, with an acceptable uncertainty, under the experimental conditions described in the method, can be considered constant for a series of analysis chips produced automatically from the same sheets of analysis material.

This quantification limit is easier to control in the case of a sheet than in the case of a single pad 3 in which the edge effects will play an important role.

It is also possible to orient the probe molecules used for the functionalization so that the sites on which the molecules to be tested can bind are oriented along the axis of the hole. This arrangement makes it possible to further increase the sensitivity (or the limit of quantification) of the analysis. The probe molecules may in particular be those described in patent EP3591024B1 (inventors Wong Ka-Leung, Goetz Joan et al.) filed on Jul. 5, 2018, namely ultra-bright luminescent lanthanide nanoparticles comprising terbium. Quantification limits of the order of a few atoms per microliter of liquid to be tested are thus achieved.

In a particular embodiment, the analysis material is not functionalized and is kept in its native structure at the level of the pads 3. In this way, a so-called "filtering" pad 32 is formed, the only function of which is a filtration function.

If one superimposes a biological sample analysis chip 1 comprising filtering pads 32 and a biological sample analysis chip 1 comprising functionalized pads 31 (31a, 31b, etc.) so that each filter pad 32 is placed above a functionalized pad 31, so that all the fluid which passes through a filtering pad 32 reaches the corresponding functionalized pad 31, it is thus possible to analyze a blood sample without prior centrifugation, the red blood cells being retained by the filtering biological sample analysis chip 1 while the serum or plasma passes through this chip to then be analyzed by the functionalized biological sample analysis chip 1.

This arrangement therefore saves considerable time and material for such analyses. In a particular embodiment, one or more pads 3 can be calibration pads 33 of the biological sample analysis chip 1.

In a particular embodiment of the injection step, a pad 3 is cooled just before injection to a temperature slightly lower than that of the support matrix 10 into which it is to be inserted. In this way, insertion is facilitated but simultaneously with insertion, the pad 3 heats up and therefore expands, preferably enough to ensure that it is held in place at the end of the injection step.

Figure 3D:
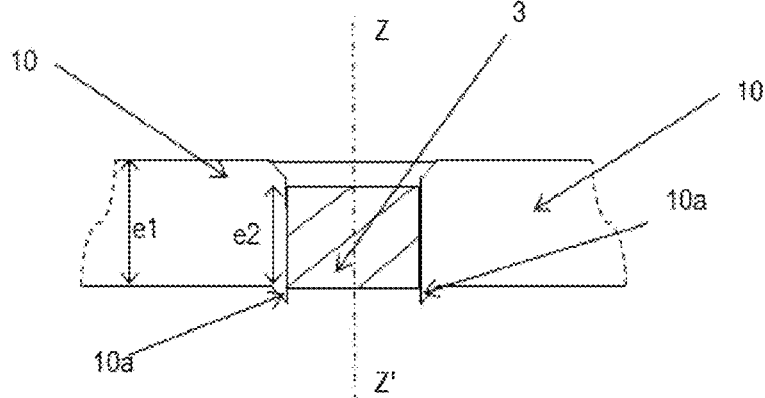
FIG. 3*d* represents a portion of support matrix at the end of a step of inserting a pad of analysis material, seen in section along a plane containing the axis of this hole, according to a particular embodiment.

This embodiment is advantageous when the support material has a particular rigidity, as is the case for certain plastic materials. After the injection step, a pad 3 is nested in a through hole 11, so that it is above at least a fraction of the overhang 10a, as shown in FIG. 3d.

If the biological sample analysis chip 1 is at rest, the pad(s) 3 remain in place in the through hole(s) 11. The biological sample analysis chip 1 could therefore possibly be used as it is.

However, insofar as no chemical or heat treatment is implemented at the injection step, it is not certain that the pads 3 remain in place, for example due to the flow of a sample liquid, forced or under the effect of gravity.

A fourth step, called assembly, is therefore implemented in such a way as to secure the assembly of the pad(s) 3 with the support matrix 10.

To do this, a pressing force along the axis of the through hole 11 is exerted on the analysis chip by means of two jaws 5a, 5b of a clamping system placed below and above the bases of the pad 3 and at least a fraction of the support matrix 10 which adjoins it.

By fraction of the support matrix 10 which adjoins a pad 3, it is meant the fraction of support matrix which is in the immediate vicinity of this pad 3 and delimits the through hole 11 in which it is inserted. In particular, the fraction of the support matrix 10 which adjoins a pad 3 can include all or part of an overhang 10a.

In a particular embodiment, the fraction of support matrix 10 which adjoins a cylindrical pad 3 along the axis of a through hole 11 and with section S can be at least that which is located in the cylindrical volume with axis the axis of the through hole 11 and of section S', S' being obtained by a dilation with a ratio greater than 1 and centered on the intersection of the axis of the through hole and of the section S. For example, if a pad 3 is cylindrical with a diameter equal to 100 micrometers, it will be possible to exert a pressing force on the portion of the support matrix located in the cylinder with the same axis as the pad 3 once inserted and with a diameter at least equal to 101 micrometers, at least equal to 102 micrometers, at the at least equal to 103 micrometers, at least equal to 104 micrometers, at least equal to 104 micrometers, at least equal to 110 micrometers, at least equal to 120 micrometers, at least equal to 130 micrometers, at least equal to 140 micrometers, 150 micrometers.

If several pads 3 are inserted into the support matrix 10, the same reasoning is applied to each of the pads 3.

In a particular embodiment, the pressing force is exerted by means of the clamping system on the whole of the upper surface and/or of the lower surface of the support matrix 10.

The pressing force can then be exerted by means of the clamping system, the jaws 5a, 5b of which, when they approach, come to grip at least a portion of the support matrix 10 which adjoins a pad 3 so that the portion of the support matrix 10 crimps the upper surface and/or the lower surface of the pad 3.

In this embodiment, it is understood that the pressing force may not include a component in a direction normal to the axis of a through hole 11. The direction of the pressing force is thus collinear with the axis of the through hole 11, so that no non-native anisotropics are introduced into the support and analysis materials in a direction non-collinear with the axis of the through hole. 11. This arrangement makes it possible in particular to precisely control the quantification limit of the analysis chip.

As a variant, the pressing force can then be exerted by means of the clamping system, the jaws 5a, 5b of which, when they approach, grip at least a portion of the lower surface and/or the upper surface of a pad 3 which would protrude of the support matrix 10, so that the upper surface and/or the lower surface of the pad 3 folds over the matrix 10 and crimps it.

The mechanical assembly step can therefore result in a crimping of at least one pad 3 on at least one of its lower and upper surfaces by the matrix 10. For simplicity, we consider in this document, the formulation of the previous sentence covers the two possible scenarios: crimping of the matrix 10 by the pad 3 or crimping of the pad 3 by the matrix 10, the technical effect being in the two cases the same, namely an assembly of at least one pad 3 to the matrix 10 resistant to a stress exerted along the axis of the through hole 11.

If a pad 3 is initially of height e2 lower than the height e1 of the through hole 11, assuming that the lower base of the pad 3 was placed higher than at least a fraction of the overhang 10a, the pressing force which is exerted along the axis of the hole makes it possible to carry out a crimping as shown in FIGS. 4a (at the start of the assembly step), 4b (during assembly) and 4c (at the end of the assembly step): the thicknesses e'1 of the support material and e'2 of the pad 3 at the end of the assembly step are less than their thicknesses e1 and e2 before this step, and the overhang 10a has been folded over the entire circumference of the pad 3 so that the support material forms a collar above and below the pad 3. In a particular embodiment, the pad 3 is crimped over the entire circumference of its lower base by the support matrix. In a particular embodiment, the pad 3 is crimped over the entire circumference of its upper base by the support matrix. Pad 3 can be crimped simultaneously over the entire circumference of its lower base and over the entire circumference of its upper base.

Consequently, the pad 3 is assembled more solidly to the support matrix 10 after this assembly step than before and is more resistant to tearing due to a force exerted from the upper face towards the lower face of this pad. During the assembly step, the fact of exerting only a mechanical action, the latter being moreover exerted in the direction of the axis of a through hole 11 and possibly distributed uniformly on the bases of a pad 3 makes it possible to maintain the uniformity and the isotropy of the physico-chemical properties of the analysis material in the planes normal to the axis of the concerned through hole 11.

The pressure exerted during this assembly step can be chosen according to the mechanical resistance of the assembly necessary for the analyses.

For example, it is possible to obtain a biological sample analysis chip 1 whose pads 3 remain in place when a fluid passes through them in a forced manner by means of a pressure difference between the upstream face and the downstream face of the pad lower than 100 mbar (millibar); less than 200 mbar; less than 300 mbar; less than 400 mbar; lower than 500 mbar; less than 600 mbar; less than 650 mbar; less than 700 mbar; lower than 750 mbar; less than 800 mbar; less than 850 mbar; less than 900 mbar; lower than 950 mbar; less than 1.00 bar.

The upstream and downstream faces are understood here relative to the direction and direction of fluid flow.

It is considered that an analysis pad 3 "remains in place" if, at the end of the analysis, this analysis pad still completely closes the through hole 11 in which it was inserted. In particular, a shift of the pad 3 in the direction of the axis of the through hole due to the pressure difference between its upstream and downstream faces can occur without contesting the quality of the analysis carried out by means of the biological sample analysis chip 1.

If the analysis pad 3 "stays in place" when a pressure difference exists between its upstream and downstream faces, it will then be said that the biological sample analysis chip 1 "resists" the corresponding relative vacuum.

The upper face of a pad 3 can, in a particular embodiment, simply be subjected to atmospheric pressure and the lower face placed under depression. In this way, an analysis device comprising a biological sample analysis chip 1 can be implemented with forced circulation of fluid, which makes it possible to control the contact time of the sample to be tested with a pad 3 and therefore the reproducibility of the analysis.

This arrangement also makes it possible to reduce the duration of the analyses.

In particular, the forced circulation of the sample to be tested avoids, or at least accelerates, the washing steps generally necessary to eliminate the fraction of the test sample which has not reacted as well as the molecules which have adsorbed in a non-specific way on the membrane. For example, it is possible to perform a blood test over a period of 30 minutes between the deposit of the sample (not centrifuged) and the result of the analysis. A conventional ELISA test requires a much longer time, usually 12 to 24 hours.

The mechanical assembly is carried out in the solid phase, and at a temperature below the melting temperatures of the support and analysis materials. This assembly therefore does not implement a process of the welding type, for example, which could denature the materials or modify their physical structure.

Thanks to the assembly method according to the invention, there is no possibility of migration of the support material or of a solvent towards the analysis material and vice versa, so that the analysis material retains from the properties its native properties, that is to say its properties before assembly with the support material. In addition, the interface between the support material and the analysis material is clean, as can be seen in FIG. 8a on which a photograph of a section of a biological sample analysis chip 1 in a plane containing the axis of a cylindrical through hole 11 and a diameter of its section is presented. In this case, as in the case of FIG. 8d, the support material is the black paper distributed by the company Mondi®, with a weight of 80 g/m2, available on the priority date of the present patent application. It has been impregnated with Le Parfait® food paraffin (reference 365 EMB 44 026, packaging 250 g) so that a support matrix pierced with 9 holes weighs 55 mg before impregnation and 77 mg after impregnation. The analysis material is nitrocellulose (Reference: Amersham Protran® Premium pores 0.45 μm NitroCellulose, GE Healthcare Life Science Nitrocellulose Blotting Membrane Nucleic acid and Protein application Catalog No 10600008).

The diameter of the through holes is 500 micrometers. The photographs in FIGS. 8a, 8c and 8d were obtained with a binocular magnifying glass (Zeiss, model STEMI SV8, magnification ×64). It is further noted that in FIGS. 8d and 9 that at the magnification of the binocular loupe, the analysis material and the support material do not diffuse towards each other. Finally, it is observed in FIGS. 8a, 8d and 9 that the process for preparing the analysis chip makes it possible to obtain wells whose edges are clean and this with dimensions of the order of ten or hundred of micrometers.

The situation is different in the case of FIGS. 8b and 8c, which show a photograph of an analysis chip obtained with a printing process using a solid ink printer whose wells have a diameter of 500 micrometers. It is observed in this photograph that the ink used to form the wells diffuses towards the analysis material, so that the section of a well is not really circular, which affects the precision of the analysis as well as to its reproducibility, the contours of two different wells never being strictly the same.

The white spots present (other than the pads 3) in the support material of FIG. 8c correspond to areas in which the ink forming the pellets has diffused. The support material has therefore lost its native properties as a result of printing and the quantity of ink forming a given pad is therefore not known. The reproducibility and precision of an analysis on a pad is therefore difficult to control with this method of the prior art.

It will be noted in FIG. 8*d*, whose magnification is substantially equal to that of FIG. 8*c*, that the grain of the support material is observed but no diffusion of the analysis material towards the support material. The same is true in the case of FIG. 9.

The method according to the invention therefore makes it possible to obtain finer control of the analysis pads 3 than the methods of the prior art.

At the end of the assembly step, it is possible to carry out a functionalization step of one or more pads 3.

By way of example, a chosen volume of a solution of probe molecules can be deposited with a pipette or a micropipette, optionally in an automated manner, on one or more pads 3.

The bio-functionalization of a biological sample analysis chip 1 consists in particular in attaching a capture molecule (for example an antibody to detect an antigen) targeting the complex biomolecule to be detected and quantified in the biological liquid to be analyzed.

In a particular embodiment, a roll of analysis chips 1, in which the pads 3 are already in place, can be placed on a "spotting" machine. The roll is unrolled to scroll the strips of analysis chips 1 on a filter plate connected to a vacuum pump. The injection head of the spotting machine deposits, for example, in 2 or 3 injections, a volume of the order of 10 µL of a solution containing the captured molecule, for example, at a concentration of 10 to 30 µg/mL.

The suction vacuum can be chosen to allow a slow filtration over a time of approximately 20 seconds of the 10 µL of solution. All of the pads 3 of each biological sample analysis chip 1 can thus be processed in the same way.

A second application can then be carried out under the same conditions but with a solution of BSA (Bovine Serum Albumin), for example at a concentration of around 100 µg/mL. This solution makes it possible to saturate the polar sites of the filtering biological sample analysis chip 1 to avoid non-specific bonds between the biomolecule which will be detected and the analysis surface, for example of nitrocellulose, of the biological sample analysis chip 1.

After incubation of the roll of analysis chips 1, for example at 37 degrees Celsius for 30 minutes, the analysis chips 1 can be separated from each other with a cutting tool so as to obtain isolated analysis chips all of the same dimensions. At the end of the assembly step, and possibly after functionalization, it is therefore possible, if this has not already been done previously, to cut the base parts 12 to detach the analysis chip(s) 1 from the support strip 2. A biological sample analysis chip 1 obtained by the method according to the invention can be stored for several months at room temperature, preferably in a dry atmosphere (for example under airtight and watertight protection). In particular, analysis chips 1 can be stored at 20° C.+/−5° C. for at least 1 month, at least 2 months, at least 3 months, at least 4 months, at least 5 months, at least 6 months, at least 7 months, at least 8 months, at least 9 months, at least 10 months, at least 11 months, at least 12 months without altering their analysis properties. In particular, a reference test on a reference biological sample will statistically give the same concentration of the analyte sought (same mean and same standard deviation) on a batch of biological sample analysis chips 1 just after manufacture and after storage at 20° C.+/−5° C. under airtight and watertight protection (e.g. blister pack) for at least 1 month, at least 2 months, at least 3 months, at least 4 months, at at least 5 months, at least 6 months, at least 7 months, at least 8 months, at least 9 months, at least 10 months, at least 11 months, at least 12 months.

The last two steps (injection and assembly) make it possible to control the properties of the support material independently of the properties of the analysis material and vice versa, unlike the methods of the prior art.

Typically, if the support material is formed from a metal plate, this metal plate can be rendered hydrophobic beforehand. For example, a surface treatment, such as a coating with a natural or synthetic wax, can be implemented.

In the known methods, such a treatment limits the analytical qualities of the chip, since the wax can migrate in an uncontrolled manner from the support material to the analysis material, for example upon a step of heating, chemical treatment or rolling. The wax (or any other chemical compound used for the surface treatment) can then interfere with the analysis. Among other things, fluorescence quenching phenomena are observed, which reduce the sensitivity of the analysis when fluorescent probe molecules are used. In the invention, the assembly step does not lead to such uncontrolled diffusion or migration of the wax. Certain embodiments even make it possible to avoid an uncontrolled diffusion or migration of chemical species from the analysis pads 3 or towards these pads 3. The method according to the invention therefore makes it possible to obtain a biological sample analysis chip 1 whose test zones (in other words the analysis pads 3) are formed with better precision than with the methods of the prior art.

This analysis is also valid for the case where pads 3 are functionalized before the injection step.

We can therefore see the advantage of the injection step according to the invention, which makes it possible to limit the interference between the support and analysis materials which constitute it, and thus to obtain a biological sample analysis chip 1 of low limit of quantification. In addition, no solvent or heat treatment is involved in the injection and assembly steps of the test areas with the support matrix. These steps can be performed using simple tools. The process is therefore inexpensive, rapid, and not very polluting.

Insofar as one of the materials among the support and analysis materials can be hydrophilic, it will be possible in a particular embodiment to work under controlled hygrometry conditions for one or more steps of the process, so as to keep a precise control over the geometry and the volume of the support matrix 10 and/or the pads 3 of a biological sample analysis chip 1.

A biological sample analysis chip 1 obtained by the method according to the invention can be implemented in isolation. In this case, a sample to be analyzed can be deposited on one or more of the pads 3 of the chip. Or even several samples to be analyzed can each be deposited on one or more pads 3 different from those used for the other samples, simultaneously or successively.

The biological sample analysis chip 1 can, to do this, be placed horizontally, so that a given liquid sample to be analyzed flows from the upper face of the pad 3 on which it has been deposited towards the underside of this same pad 3, either under the effect of gravity or under the effect of a pressure gradient, a relative vacuum being applied on the side of the underside of the pad 3.

Several analysis chips 1, in particular functionalized differently from each other, can be superimposed in as described in application WO2014/053,237A1, so that different channels are formed, each channel containing a single pad 3 or several pads 3, each of the latter belonging to a different biological sample analysis chip 1.

Figure 6:
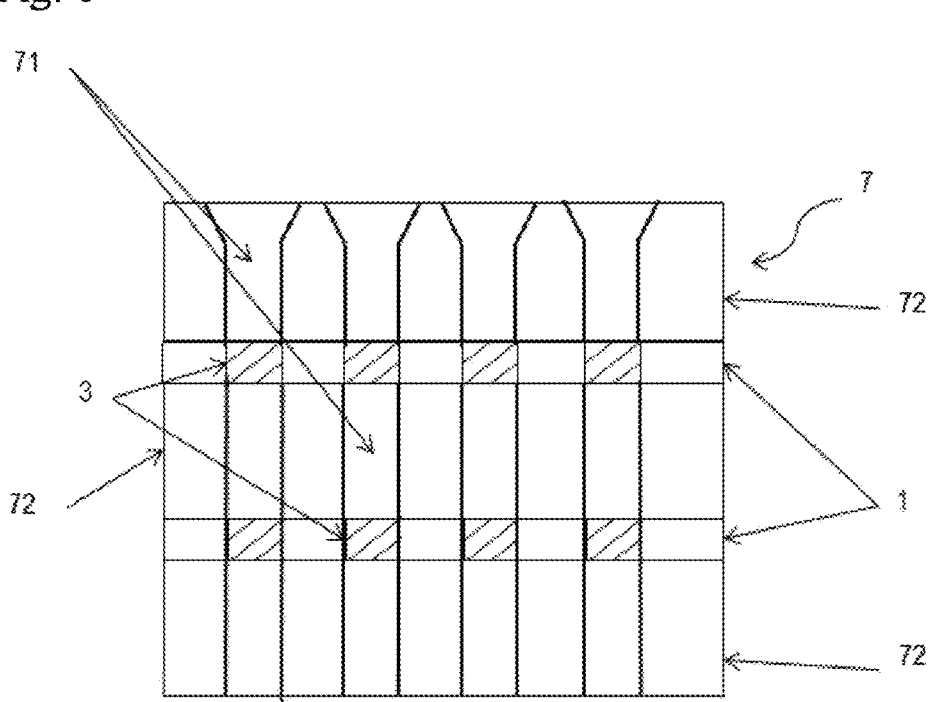
FIG. 6 shows a multiplexed analysis device comprising two analysis chips.

Such a three-dimensional multiplexed analysis device is schematically represented in FIG. 6. The analysis device 7 consists of a stack of solid support plates 72, for example made of polymethyl methacrylate (PMMA) or another plastic material, in which microchannels 71 are formed and between which analysis chips 1 are inserted.

The microchannels are aligned with each other and the analysis sites (that is to say the pads 3) of the analysis chips 1 are inserted between two microchannels of two consecutive support plates 72. It is also possible to superimpose several analysis chips 1 between two consecutive support plates 72. In this case, if different samples to be analyzed are tested in the different channels, it is possible to perform a 3D multiplexed analysis.

More simply, it is possible to provide an analysis device 7 comprising four pillars on which the biological sample analysis chip 1 is fixed by its four corners. These two examples are non-limiting. The detection of an analyte of interest can be done by an immunological analysis of the ELISA type: once the complex of capture molecule/biomolecule of interest has formed on the analysis sites (or equivalent wells) of the biological sample analysis chip 1, a revealing antibody is added which specifically binds to the capture molecule/biomolecule complex. The fluorescence or color that appears in each well is measured using a device such as a photomultiplier or a CMOS-type camera, coupled with a computer program that performs the calculations.

The invention therefore also relates to an analysis device 7 comprising at least one biological sample analysis chip 1.

The analysis device 7 can contain several analysis chips 1, in particular superimposed, as described above.

The invention further relates to a diagnostic kit comprising at least one biological sample analysis chip 1.

The diagnostic kit can also comprise a support for the biological sample analysis chip 1 and/or at least one analysis reagent. The analysis reagent may in particular contain one or more antibodies or one or more antigens with a view to implementing an immunological test. The analysis reagent can also be a revealer.

In the case of the present application, the term immunological test ("immunoassay") is understood to mean a test implementing at least one antigen to detect antibodies directed against a pathogenic agent in a sample or at least one antibody to detect an antigen of a pathogen in a sample.

The analysis reagent can also be a buffer, for example a saline phosphate buffer (PBS) or another solution, for example a solution of bovine serum albumin (BSA).

The invention relates to the use of a biological sample analysis chip 1 for diagnostic purposes or for carrying out an immunological test. In particular, serological research tests at the quantification of antibodies of the immunoglobulin G or M type (IgG or IgM) can be implemented after functionalizations of the biological sample analysis chip 1 by means of the appropriate antigen. The biological sample analysis chip 1 can also be functionalized to search for and quantify heat shock proteins such as the proteins of the HSP60 family by means of a specific antibody, for example fluorescent. The apolipoprotein ApoA1 or even mediators of inflammation such as C-reactive protein (CRP) or the pancreatic stabilizing protein PSP ("pancreatic stone protein") can be sought by the implementation of an enzymoimmunological method on the biological sample analysis chip 1.

The invention finally relates to a device for manufacturing a biological sample analysis chip 1 according to any one of the embodiments comprising:

an insertion system suitable for inserting at least one pad 3 into at least one through hole 11 of the matrix 10 by translation of the pad 3 in the direction normal to the upper and lower surfaces of the matrix 10 a mechanical assembly system at a temperature below the melting temperatures of the support and analysis materials, adapted to exert a pressing force in the direction normal to the lower and upper surfaces of the matrix 10 on at least a portion of the matrix 10 which adjoins the at least one pad 3 inserted into the matrix 10 and/or on at least one of said lower and upper surfaces of the at least one pad 3 inserted into the matrix 10.

The device for manufacturing a biological sample analysis chip 1 can in particular comprise one or more punches, each comprising one or more punches which may or may not be identical and whose stroke is adjustable, and one or more counter-parts.

The device for manufacturing a biological sample analysis chip 1 can be fully automated.

LIST OF REFERENCE SIGNS

1: analysis chip
10: support matrix
10*a*: overhang of support material
11: hole through the support matrix 10
11*a*, 11*b*: sub-part of a through hole 11
11*c*: channel connecting two sub-parts 11*a* and 11 *b*
12: cut/reference mark
2: support strip
21: base part
3: pad of analysis material
31*a, b, c*: functionalized pad 3
32: filter pad
33: calibration pad
4: cutting guide
42: punch of a cutter
5*a*, 5*b*: jaws of a press
6: sheet of analysis material
7: multiplexed analysis device
71: microchannel
72: support plate

The invention claimed is:

1. Method for manufacturing a biological sample analysis chip, wherein the method comprises:

a matrix formed in a solid support material, having a lower surface and an upper surface and in which at least one hole extending between said lower and upper surfaces has been formed, is provided, wherein said through hole is a cylinder of revolution;

at least one pad is provided, cut from a sheet of solid and porous analysis material, said pad having a lower surface and an upper surface, the at least one pad is inserted into the at least one through hole of the matrix by translation of the at least one pad in the direction normal to the lower and upper surfaces of the matrix;

a mechanical assembly is carried out at a temperature below the melting temperatures of the support and analysis materials, during which a pressing force in the direction normal to the lower and upper surfaces of the matrix is exerted on at least one portion of the matrix which adjoins said at least one pad inserted into the matrix and/or on at least one of the lower and upper surfaces of the at least one pad inserted into the matrix, said mechanical assembly of the at least one pad with the matrix resulting in the at least one pad being crimped on at least a portion of its lower and upper surfaces by the matrix.

2. Method for manufacturing a biological sample analysis chip according to claim 1, characterized in that the said pressing force is exerted on a portion of the matrix which adjoins the at least one pad inserted into the matrix.

3. A method of manufacturing a biological sample analysis chip according to claim 1, characterized in that the said pressing force is exerted on at least one of the lower and upper surfaces of the at least one pad inserted into the matrix.

4. Method of manufacturing a biological sample analysis chip according to claim 1, characterized in that the support material is hydrophobic and the analysis material is hydrophilic.

5. Method for manufacturing a biological sample analysis chip according to claim 1, characterized in that, for the insertion of the at least one pad in the at least one through hole, the at least one pad is translated into the at least one through hole by means of a punch, in that the at least one pad has been cut from the sheet of analysis material before its insertion by means of this same punch and in that the at least one through hole has been formed beforehand in the matrix by means of this same punch.

6. Method of manufacturing a biological sample analysis chip according to claim 1, characterized in that after the mechanical assembly, the functionalization of the at least one pad is carried out.

7. Method for manufacturing a biological sample analysis chip according to claim 1, characterized in that the functionalization of the analysis material is carried out before the inserting the at least one pad into the matrix.

8. Method of manufacturing a biological sample analysis chip according to claim 1, characterized in that before the insertion of the at least one pad in the matrix, the at least one pad is brought to a temperature lower than that of the matrix.

9. Method for manufacturing a biological sample analysis chip according to claim 5, characterized in that the functionalization of the analysis material is carried out before the inserting the at least one pad into the matrix and characterized in that the insertion of at least one pad into the matrix is repeated at least once using for each new insertion a functionalized analysis material different from that used for the previous insertion and a punch corresponding to at least one through hole of the matrix different from the one used for the previous insertion.

10. Biological sample analysis chip, wherein the biological sample analysis chip comprises:

a matrix formed in a solid support material, having a lower surface and an upper surface and in which at least one through hole extending between said lower and upper surfaces has been formed, said through hole being a cylinder of revolution;

at least one pad, cut from a sheet of solid and porous analysis material and inserted into the at least one through hole, the at least one pad having a lower surface and a upper surface, and characterized in that the at least one pad is crimped on at least one of its upper and lower surfaces by the matrix.

11. Biological sample analysis chip according to claim 10, in which the support material comprises at least one component chosen from among a metal, a plastic material and cellulose or a combination thereof and in that the analysis material of which the at least one pad is formed comprises at least one component chosen from nitrocellulose, cellulose and an organic polymer.

12. Biological sample analysis chip according to claim 10, in which the assembly of the at least one pad and the matrix is resistant to at least a relative vacuum equal to 0.100 bar.

13. Analysis device comprising at least two biological sample analysis chips according to claim 10 superimposed and in which the at least one pad of one of the at least two chips is configured to perform a filtration function and is superimposed with the at least one functionalized pad of another chip of the at least two chips.

14. Diagnostic kit comprising at least one biological sample analysis chip according to claim 10 and at least one analysis reagent.

15. Device for manufacturing a biological sample analysis chip according to claim 10, said manufacturing device comprising:

an insertion system suitable for inserting the at least one pad into the at least one through hole of the matrix by translation of the pad in the direction normal to the lower and upper surfaces of the matrix;

a mechanical assembly system at a temperature below the melting temperatures of the support and analysis materials, adapted to exert a pressing force in the direction normal to the lower and upper surfaces of the matrix on at least a portion of the matrix which adjoins the at least one pad inserted into the matrix and/or on at least one of said lower and upper surfaces of the at least one pad inserted into the matrix, said mechanical assembly of the at least one pad with the matrix resulting in the at least one pad being crimped on at least a portion of its lower and upper surfaces by the matrix.

16. Method of manufacturing a biological sample analysis chip according to claim 1, characterized in that the support material is hydrophilic and the analysis material is hydrophobic.

* * * * *